June 2, 1925.
G. H. F. HOLY
ELECTRIC LOCOMOTIVE
Filed Jan. 13, 1922
1,539,841
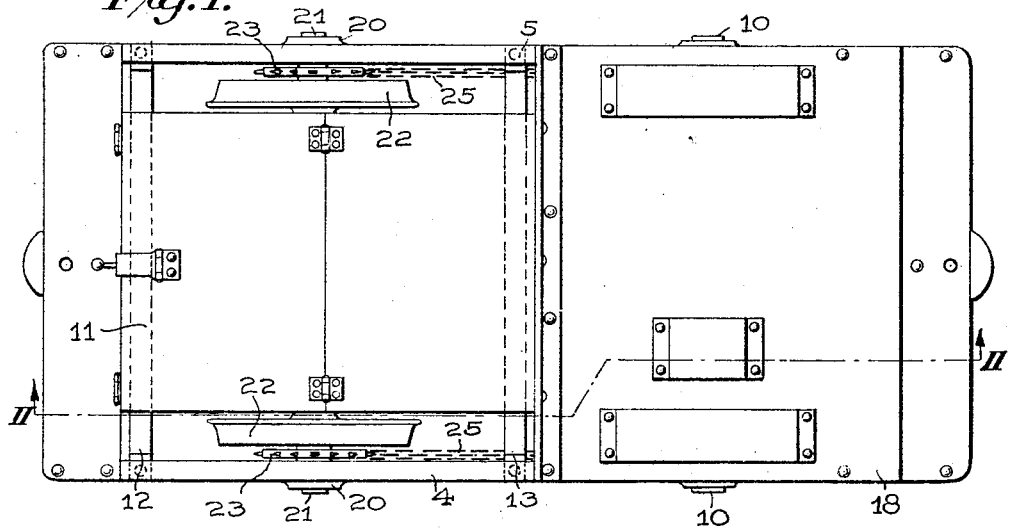
Fig.1.
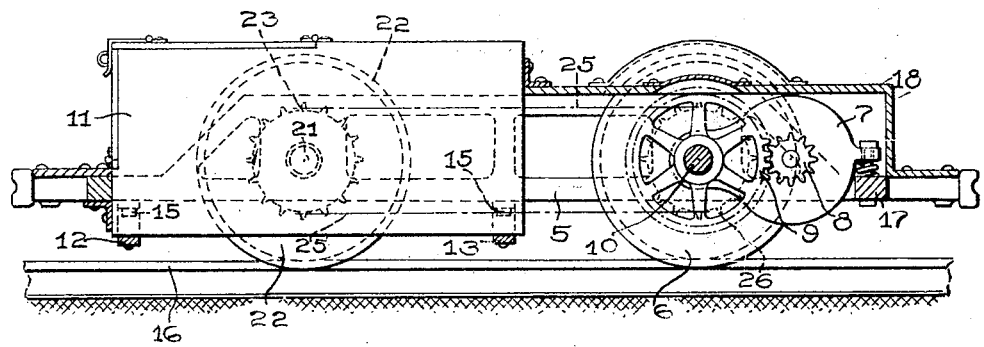
Fig.2.
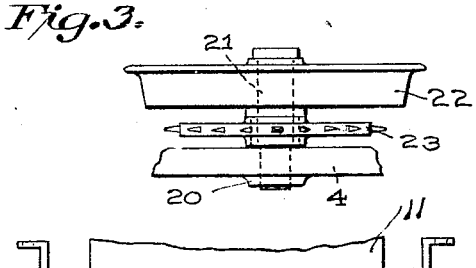
Fig.3.
Fig.4.
WITNESSES:
R. S. Harrison
A. Martin
INVENTOR
George H. F. Holy
BY
Charles G. Carr
ATTORNEY Patented June 2, 1925.

1,539,841

UNITED STATES PATENT OFFICE.

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRIC LOCOMOTIVE.

Application filed January 13, 1922. Serial No. 528,988.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Electric Locomotives, of which the following is a specification.

My invention relates to electric locomotives and particularly to frame-work of an improved form and an arrangement of driving mechanism therefor.

My invention is especially applicable for use in connection with mining locomotives of the storage-battery type or of the combined storage-battery and trolley type, wherein provision must be made for carrying battery boxes. The veins of coal in some mines are comparatively thin and difficulty is encountered in providing, on a locomotive, within the limited amount of head room available, sufficient space for the batteries. Usually, the only space available for batteries is adjacent to one end of the locomotive and above the axle at that end.

One object of my invention is to provide an improved form of frame and driving structure wherein the platform or compartment that serves to support the battery or other portions of the locomotive may be located at a comparatively short distance above the road bed, in that such platform need not necessarily be placed above the axle of the vehicle.

A further object of my invention is to simplify and improve generally mine locomotives and the driving mechanism therefor.

As shown in the accompanying drawings,

Figure 1 is a plan view of a locomotive embodying my invention,

Fig. 2 is a sectional view taken on line II—II of Fig. 1, and

Fig. 3 is a detail view of one of the traction wheels and the mounting therefor, and Fig. 4 is an end elevational view of a tie-rod and a fragmentary portion of a battery compartment mounted thereon.

A locomotive is provided with side frames 4 and 5 that serve to support a pair of wheels 6 in the usual manner.

At the forward end of the locomotive, a motor 7 is provided which drives a pinion 8 and a coacting gear wheel 9 that is connected to an axle 10. The apparatus just described may be of the ordinary type and the motor 7 may be supplied with current either through a trolley (not shown) or from batteries contained within a battery box 11.

The side frames 4 and 5, toward their other ends, are connected by cross-ties 12 and 13 (Fig. 4) that are bolted, at their ends, to the side frames, by means of bolts 15. It will be seen that the ties 12 and 13 are bent downwardly at points adjacent to the bolts 15 and extend across the space between the side frames 4 and 5. It is obvious that the depressed portions of the cross-ties 12 and 13 may be made of any depth desired, if provision is made for sufficient clearance between the undersides thereof and the roadbed or the tops of rails 16 upon which the locomotive runs.

The battery box 11 is supported by the cross-ties 12 and 13. By reason of the low height of said cross-ties, ample battery space may be provided between such ties and the roof of the mine. At their forward ends, the side frames 4 and 5 may be connected in the usual manner, that is, by cross-ties 17 and plates 18.

Each of the side frames 4 and 5 is provided with bosses 20. The side frames and the bosses 20 are perforated for the reception of the outer ends of axles 21 that have press fit engagement therewith, the bosses being provided so that the axles 21 will have sufficient support.

Wheels 22 are rotatably mounted upon the axles 21 and are provided with hub portions upon which the sprocket wheels 23 are mounted. The sprocket wheels 23 are driven by chains 25 which engage sprocket wheels 26 that are rigidly secured to the axle 10, the chains 25 being indicated by dotted lines, for clearness of illustration.

If it is desired to use the locomotive without a battery, the space for such battery may be utilized as an operating station for the motorman or to accommodate apparatus such as traction or current-collecting reels, etc.

It will be seen by the foregoing that I provide a locomotive wherein the amount of head room ordinarily available in mine locomotives is increased without any decrease in the driving efficiency thereof and without disturbing, to any marked degree, the general arrangement of parts of locomotives of this type.

Various changes in detail and arrangement may be made without departing from the spirit and scope of the invention, as defined in the accompanying claims.

What I claim as my invention is:

1. The combination, in an electric vehicle, of a wheeled axle, a motor for driving the axle, a pair of side frames, a wheel supported by each of the side frames at points removed from the said axle, each of the said wheels being independently mounted, a battery compartment, and means disposed below the axes of the said wheels for supporting the said compartment.

2. The combination, in an electric vehicle, of a wheeled axle, a motor for driving the axle, a pair of side frames, a wheel supported by each of the side frames at points removed from the said axle, each of the said wheels being independently mounted, a battery compartment between the wheels, and means disposed below the axes of the said wheels for supporting the said compartment, the space between the wheels being unobstructed to permit the placing of the said compartment.

3. The combination, in an electric vehicle, of a wheeled axle, a motor for driving the axle, a pair of side frames, a wheel supported by each of the side frames at points removed from the said axle, each of the said wheels being independently mounted, a battery compartment, means disposed below the axes of the said wheels for supporting the said compartment, and driving connections between the said axle and each of the said wheels disposed parallel and in proximity to the side frames.

4. The combination, in a vehicle, of two side frames each of which serves as an independent support for a wheel, the space between the wheels being unobstructed, cross-ties for the side frames disposed in a horizontal plane that lies below the axes of the said wheels a distance substantially equal to the radii of the wheels, and a battery compartment mounted on said cross-ties.

5. The combination, in a vehicle, of two side frames each of which serves as an independent support for a wheel, the space between the wheels being unobstructed, cross-ties for the side frames disposed in a horizontal plane that lies below the axes of the said wheels, and a battery compartment secured to said cross-ties.

In testimony whereof, I have hereunto subscribed my name this 10th day of January, 1922.

GEORGE H. F. HOLY.